United States Patent
Schneider (10) Patent No.: US 8,683,458 B2
(45) Date of Patent: *Mar. 25, 2014

(54) AUTOMATIC FULL INSTALL UPGRADE OF A NETWORK APPLIANCE

(75) Inventor: James P. Schneider, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 1282 days.

This patent is subject to a terminal disclaimer.

(21) Appl. No.: 11/998,552

(22) Filed: Nov. 30, 2007

(65) Prior Publication Data

US 2009/0144722 A1 Jun. 4, 2009

(51) Int. Cl.
*G06F 9/445* (2006.01)

(52) U.S. Cl.
USPC ........................................ 717/171; 717/172

(58) Field of Classification Search
USPC ....................................................... 717/171
See application file for complete search history.

(56) References Cited

U.S. PATENT DOCUMENTS

| | | |
|---|---|---|
| 5,155,847 A | 10/1992 | Kirouac et al. |
| 5,721,907 A | 2/1998 | Pyne |
| 5,752,042 A | 5/1998 | Cole et al. |
| 5,845,077 A | 12/1998 | Fawcett |
| 5,950,010 A | 9/1999 | Heese et al. |
| 5,999,740 A | 12/1999 | Rowley |
| 6,038,568 A | 3/2000 | McGrath et al. |
| 6,076,084 A | 6/2000 | Harlan |
| 6,098,079 A | 8/2000 | Howard |
| 6,253,300 B1 * | 6/2001 | Lawrence et al. ............. 711/173 |
| 6,266,809 B1 * | 7/2001 | Craig et al. .................... 717/173 |
| 6,363,524 B1 | 3/2002 | Loy |
| 6,477,703 B1 | 11/2002 | Smith et al. |
| 6,493,871 B1 | 12/2002 | McGuire et al. |
| 6,513,050 B1 | 1/2003 | Williams et al. |
| 6,636,872 B1 | 10/2003 | Heath et al. |
| 6,751,794 B1 | 6/2004 | McCaleb et al. |
| 6,757,900 B1 | 6/2004 | Burd et al. |
| 6,880,086 B2 | 4/2005 | Kidder et al. |
| 7,145,682 B2 | 12/2006 | Boldon |
| 7,356,679 B1 | 4/2008 | Le et al. |
| 7,478,381 B2 | 1/2009 | Roberts et al. |
| 7,487,383 B2 * | 2/2009 | Bensinger .................... 714/4.11 |
| 7,512,635 B1 | 3/2009 | Solin |
| 7,543,118 B1 | 6/2009 | Chen et al. |
| 7,574,706 B2 | 8/2009 | Meulemans et al. |
| 7,624,086 B2 | 11/2009 | Keith, Jr. |
| 7,702,673 B2 | 4/2010 | Hull et al. |
| 7,756,826 B2 | 7/2010 | Bots et al. |
| 7,877,357 B1 | 1/2011 | Wu et al. |

(Continued)

OTHER PUBLICATIONS

Arora et al., "An Empirical Analysis of Software Vendors' Patching Behavoir: Impact of Vulnerability Disclosure"; Carnegie Mellon University, 2006, 33pg.

(Continued)

*Primary Examiner* — Li B Zhen
*Assistant Examiner* — Viva Miller
(74) *Attorney, Agent, or Firm* — Lowenstein Sandler LLP (57) ABSTRACT

A method and apparatus for upgrading a network appliance. In one embodiment, a network appliance determines that it should be upgraded using a full install image. The network appliance then reserves an upgrade staging area in its memory device, downloads the full install image from a server to the upgrade staging area, and marks the upgrade staging area as bootable. Further, the network appliance reboots itself, and installs the full install image.

20 Claims, 4 Drawing Sheets

(56) References Cited

U.S. PATENT DOCUMENTS

| | | | |
|---|---|---|---|
| 7,900,056 B1 | 3/2011 | Murphy, Jr. | |
| 7,925,711 B1* | 4/2011 | Gopalan et al. | 709/212 |
| 7,937,699 B2 | 5/2011 | Schneider | |
| 2002/0085028 A1 | 7/2002 | Tabatabai et al. | |
| 2002/0087668 A1* | 7/2002 | San Martin et al. | 709/221 |
| 2002/0100036 A1 | 7/2002 | Moshir et al. | |
| 2002/0124245 A1 | 9/2002 | Maddux et al. | |
| 2003/0037326 A1 | 2/2003 | Burkhardt et al. | |
| 2003/0188227 A1* | 10/2003 | Maison et al. | 714/42 |
| 2003/0225797 A1 | 12/2003 | Shields et al. | |
| 2004/0003266 A1 | 1/2004 | Moshir et al. | |
| 2004/0008205 A1 | 1/2004 | O'Neill | |
| 2004/0019823 A1 | 1/2004 | Gere | |
| 2004/0040021 A1 | 2/2004 | Bharati et al. | |
| 2004/0153478 A1 | 8/2004 | Igouchkine | |
| 2004/0181790 A1 | 9/2004 | Herrick | |
| 2004/0215755 A1* | 10/2004 | O'Neill | 709/223 |
| 2005/0055595 A1* | 3/2005 | Frazer et al. | 713/400 |
| 2005/0080823 A1 | 4/2005 | Collins | |
| 2005/0132359 A1* | 6/2005 | McGuire et al. | 717/175 |
| 2005/0198239 A1 | 9/2005 | Hughes | |
| 2005/0273472 A1 | 12/2005 | Reddy et al. | |
| 2006/0064459 A1 | 3/2006 | Matsushima | |
| 2006/0080385 A1* | 4/2006 | Blandford et al. | 709/203 |
| 2006/0089954 A1 | 4/2006 | Anschutz | |
| 2006/0130045 A1 | 6/2006 | Wesley et al. | |
| 2006/0149806 A1 | 7/2006 | Scott et al. | |
| 2006/0195816 A1 | 8/2006 | Grandcolas et al. | |
| 2007/0143392 A1 | 6/2007 | Choe et al. | |
| 2007/0255530 A1 | 11/2007 | Wolf | |
| 2007/0294368 A1 | 12/2007 | Bomgaars et al. | |
| 2008/0295092 A1 | 11/2008 | Tan et al. | |
| 2008/0306883 A1 | 12/2008 | Baffier et al. | |
| 2008/0306986 A1 | 12/2008 | Doyle, Sr. | |
| 2009/0300603 A1 | 12/2009 | Schneider | |

OTHER PUBLICATIONS

Balani et al., "Multi-level Software Reconfiguration for Sensor Networks"; ACM, 2006, 10pg.

Dunkels et al., "Run-Time Dynamic Linking for Reprogramming Wireless Sensor Networks"; ACM, 2006, 14pg.

Shogan et al., "Compact Binaries with Code Compression in a Software Dynamic Translator"; IEEE, 2004, 6pg.

Red Hat Command Center 3.18, Check Reference, Red Hat, Inc., 2007, 178 pages.

Red Hat Command Center, Users Guide 3.18, Red Hat, Inc., 2007, 318 pages.

Red Hat Command Center, Release Notes 3.18, Red Hat, Inc., 2007, 7 pages.

Red Hat Command Center 3.18, Setup and Installation Guide, Red Hat, Inc., 2007, 33 pages.

Red Hat Notice of Allowance for U.S. Appl. No. 11/897,733, mailed Dec. 27, 2010.

Red Hat Office Action for U.S. Appl. No. 12/156,248, mailed Aug. 26, 2011.

Red Hat Office Action for U.S. Appl. No. 12/156,248, mailed Jan. 27, 2012.

Red Hat Notice of Allowance for U.S. Appl. No. 12/156,248, mailed Aug. 1, 2012.

USPTO, Notice of Allowance for U.S. Appl. No. 12/156,248 mailed Dec. 12, 2012.

USPTO, Advisory Action for Application No. 12/156,248 mailed Apr. 6, 2012.

* cited by examiner

AUTOMATIC FULL INSTALL UPGRADE OF A NETWORK APPLIANCE

RELATED APPLICATIONS

This application is related to U.S. patent application Ser. No. 11/897,733, filed on Aug. 31, 2007, and assigned to the assignee of the present application and hereby incorporated by reference.

TECHNICAL FIELD

Embodiments of the present invention relate to managing upgrades of network appliances, and more specifically to automatically upgrading network devices and appliances.

BACKGROUND

Networked computers are used to transmit and fetch information to and from local sources (e.g., computers used in a business) and remote sources (e.g., enterprise services offered over the Internet). To ensure privacy and security during communication between networked computers, authentication and verification mechanisms may be used. Thus, the authentication and verification mechanisms can be used to establish a trusted session between a server and client. The trusted session can be used to manage upgrades for network appliances so that malicious software is less likely to be installed during an upgrade.

Upgrading of system software and applications for many network appliances is often performed using an upgrade patch. Often the upgrades are performed using a sequential series of upgrade patches. For example, a network appliance might be powered down for a long period of time (such as months or perhaps even years) and might not be aware of the patches as they become available. In some cases, software configurations of the network appliances are so out-of-date, that the conventional mechanism for providing a sequential series of upgrade patches cannot be safely applied. In such cases, applying the long series of upgrade patches can cause the network appliance to hang during the upgrade process, and require manual intervention by skilled technicians in order to resolve the problem.

BRIEF DESCRIPTION OF THE DRAWINGS

The present invention is illustrated by way of example, and not by way of limitation, and can be more fully understood with reference to the following detailed description when considered in connection with the figures in which.

DETAILED DESCRIPTION

Described herein is a method and system for upgrading software for network appliances. In one embodiment, a network appliance determines that it should be upgraded using a full install image. The network appliance then reserves an upgrade staging area in its memory device, downloads the full install image from a server to the upgrade staging area, and marks the upgrade staging area as bootable. Further, the network appliance reboots itself, and installs the full install image.

In the following description, numerous specific details are set forth such as examples of specific systems, languages, components, etc. in order to provide a thorough understanding of the present invention. It will be apparent, however, to one skilled in the art that these specific details need not be employed to practice the present invention. In other instances, well known materials or methods have not been described in detail in order to avoid unnecessarily obscuring the present invention.

The present invention includes various steps, which will be described below. The steps of the present invention may be performed by hardware components or may be embodied in machine-executable instructions, which may be used to cause a general-purpose or special-purpose processor programmed with the instructions to perform the steps. Alternatively, the steps may be performed by a combination of hardware and software.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

Figure 1:
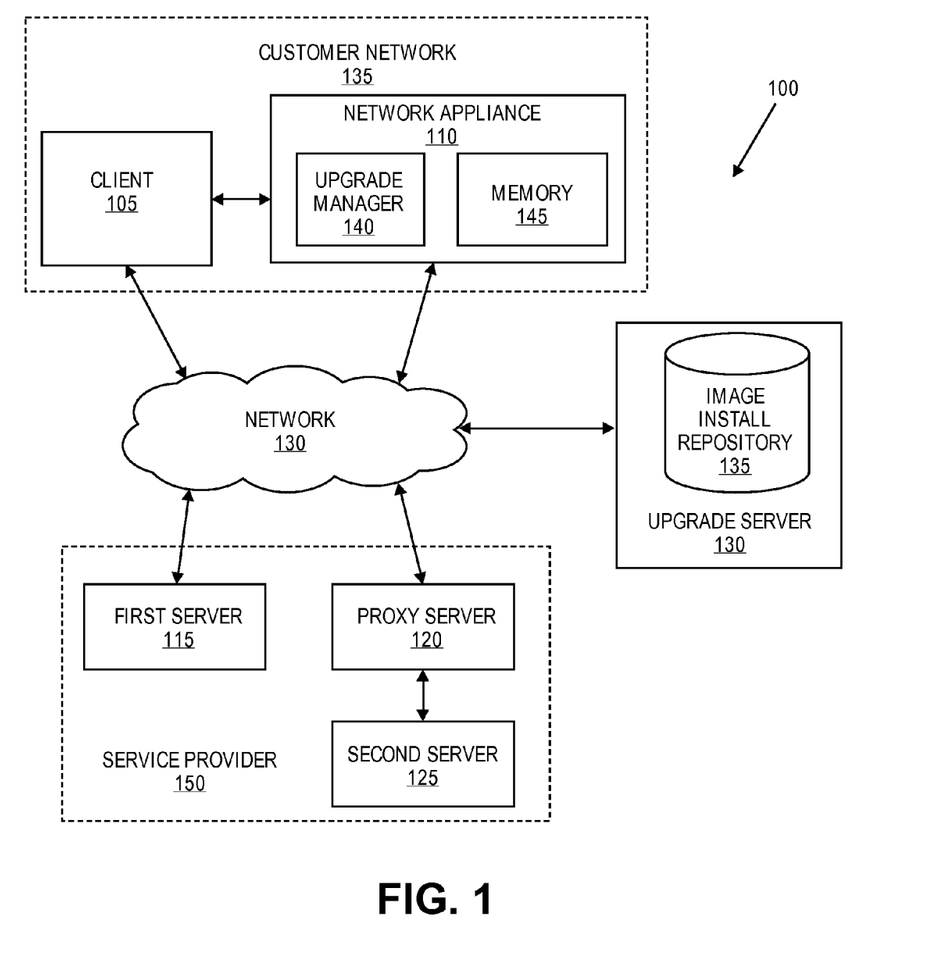
FIG. 1 illustrates an exemplary network architecture in which embodiments of the present invention may operate.

FIG. 1 illustrates an exemplary network architecture 100 in which embodiments of the present invention may operate.

The network architecture 100 may include a service provider 150 connected with a customer network 135 (e.g., a local area network (LAN), wide area network (WAN), intranet, etc.) over a public network 130 (e.g., the internet). Alternatively, the customer network 135 may be connected with the service provider provider 150 via a private network (e.g., an intranet, virtual private network (VPN), etc.).

Referring to FIG. 1, the customer network 135 may represent a network of an enterprise and may include such devices as desktop computers, laptop computers, network printers, switches, routers, gateways, firewalls, or any other devices having a network address. In one embodiment, the customer network 135 also includes a client 105 and a network appliance 110. Client 105 may be a device operated by an IT administrator or some other user. The network appliance 110 may be a device that is configurable over a network. The client 105 and the network appliance 110 may each be a computing device such as, for example, a desktop computer, laptop computer, server, etc. In one embodiment, the network appliance 110 is configured to perform a network related function (e.g., network monitoring) upon connection with the customer network 135.

Service provider 150 provides one or more services to customer network 135. In one embodiment, service provider 150 uses the network appliance 110 to collect information about the customer network 135 and devices on the customer network 135. The service provider 150 then analyzes this information, and presents the analysis to a user such as an IT administrator (e.g., via client 105). Alternatively, the service provider 150 may provide other services, such as network indexing service, etc. The service provider 150 includes one or more servers such as first server 115, proxy server 120, and second server 125 that may reside on the same or different devices. Alternatively, other server configurations may be implemented (e.g., service provider 150 may include more or fewer servers, which may have redundant or different functionality).

First server 115 may be a front end server that provides an interface to client 105 of customer network 135. Through the first server 115, users of customer network 135 may request data, initiate actions, receive information, etc. Network appliance 110 may also communicate with first server 115, for example, to request a service, initiate an action, report data, etc. In one embodiment, first server 115 is a web application server that provides a web application interface accessible to client 105 via a web browser.

Second server 125 may be a back end server that communicates with the network appliance 110 of customer network 135 to send and/or receive such data as identity certificate information, network status updates, transactions, etc. Second server 125 may also communicate data to and/or from client 105. In one embodiment, second server 125 communicates with the network appliance 110 and/or client 105 through proxy server 120. Proxy server 120 receives transmissions and, if appropriate, forwards them to second server 125. Alternatively, no proxy server 120 may be present, or multiple proxy servers may be used.

In one embodiment, the network appliance 110 performs unattended upgrade of its software without requiring any user interaction. In particular, if the network appliance 110 determines that it should be upgraded using a full install image, the network appliance 110 downloads the full install image from an upgrade server 130 to let the network appliance 110 rebuild itself. The upgrade server 130 may be coupled with the network appliance 110 via the network 130 and may be independent of the service provider 150. Alternatively, the upgrade server 130 may be part of the service provider 150 and may reside on the same machine as some or all of the other servers, or on a separate machine. The upgrade server 130 may host an image install repository 135 that stores upgrades for network appliances. For example, the image install repository 135 can store a full image (or various revisions of full images) of software to be downloaded to the network appliance. Optionally, upgrade patches (such as a sequential series of upgrade patches) can be stored in (or in association with) the image install repository 135.

In one embodiment, the network appliance 110 may include upgrade manager 140 and secondary memory storage 145. The upgrade manager 140 controls the upgrade of the network appliance 110. As discussed above, the upgrade process is completely automated. The users may not even be aware of the upgrade process, except for not being able to use the network appliance 110 while it is rebuilding itself.

The upgrade manager 140 determines whether a full install upgrade (upgrade using a full install image) should be performed. The upgrade manager 140 may decide to perform the full install upgrade if a recent upgrade performed via an upgrade patch has failed. Alternatively, the upgrade manager 140 may periodically check with the upgrade server 130 and may decide to perform the full install upgrade when the latest full install image for the network appliance 110 becomes available at the upgrade server 130.

The upgrade manager 140 may schedule the upgrade for a specific time and start the upgrade process at that time. Specifically, the upgrade manager 140 may reserve an upgrade staging area in the secondary memory storage 145 to store information relating to upgrading the software of the network appliance 110. For example, the upgrade manager 140 may download a full install image from the image install repository 135 to the upgrade staging area of the secondary memory storage 145. Likewise, the upgrade manager 140 may store configuration information (such as hardware configuration information) that can be used in conjunction with a full install image to successfully upgrade the network appliance 110. The upgrade manager 140 can then mark the upgrade staging area as bootable, and deallocate unused memory space of the network appliance 110. Further, the upgrade manager 140 can reboot the network appliance, and install the full install image onto the network appliance.

Figure 2:
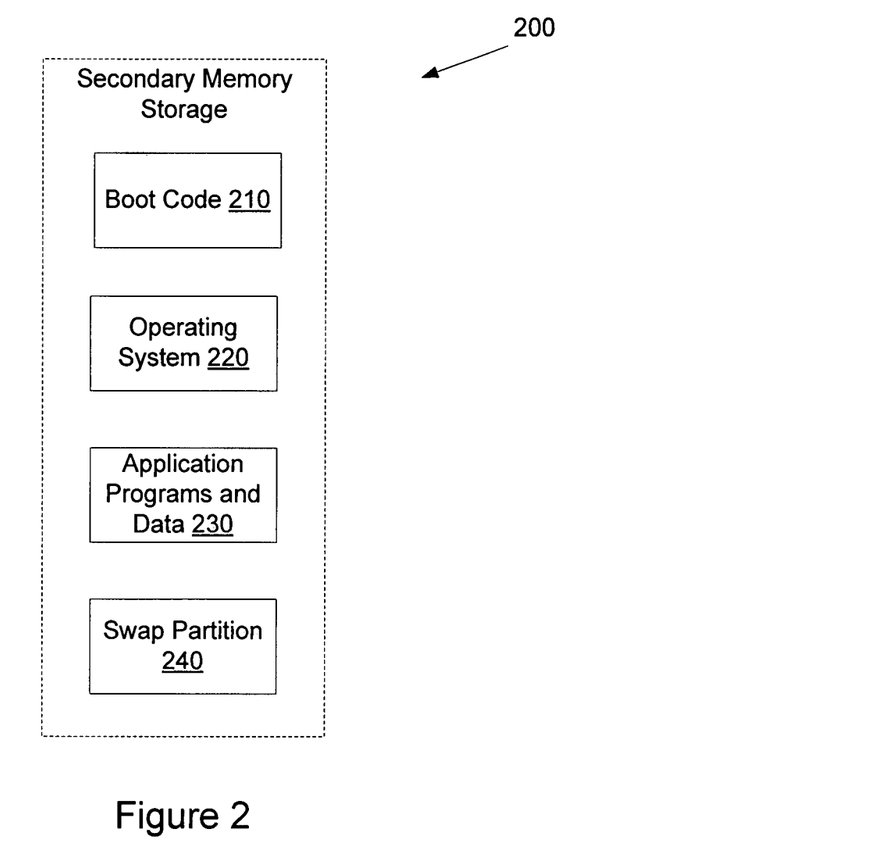
FIG. 2 is a schematic diagram illustrating a secondary memory storage device used for upgrading a network appliance, in accordance with one embodiment of the present invention.

FIG. 2 is a schematic diagram illustrating one embodiment of a memory device used for upgrading a network appliance. Secondary memory storage 200 is typically a bootable memory device such as a hard drive. Secondary memory storage 200 is usually divided into sections of reserved memory areas. The reserved memory areas can be demarcated as logical and/or physical partitions of a disk drive, memory banks, BLOBs (binary large objects) and the like.

Section 210 is reserved for use by a boot code routine, such as code contained within a boot sector of a hard drive. In various embodiments, a processor fetches a boot vector at boot time, which directs the processor program counter to execute a BIOS service to load the boot code routine from secondary memory storage 200 into a local (fast) memory. The boot code routine is executed by the processor to, for example, select and/or load an operating system.

Section 220 is reserved for storing the operating system code. The operating system is typically loaded into the processor local memory as described above, and then executed. Any portion of the operating system code can be combined with section 210, although typically the operating segment code remains segregated from the boot code routine.

Section 230 is reserved for use by application programs and data storage. The application programs typically run under the direction of the operating system and require memory in secondary memory storage 200 for storing data that is used by the application programs. Any portion of section 230 can be combined with section 220.

Section 240 is a section of secondary memory storage 200 that is used for storing information relating to the upgrade of the network appliance 157. For example, section 240 can be a swap partition re-purposed for the upgrade process since there is no swapping during the upgrade.

Figure 3:
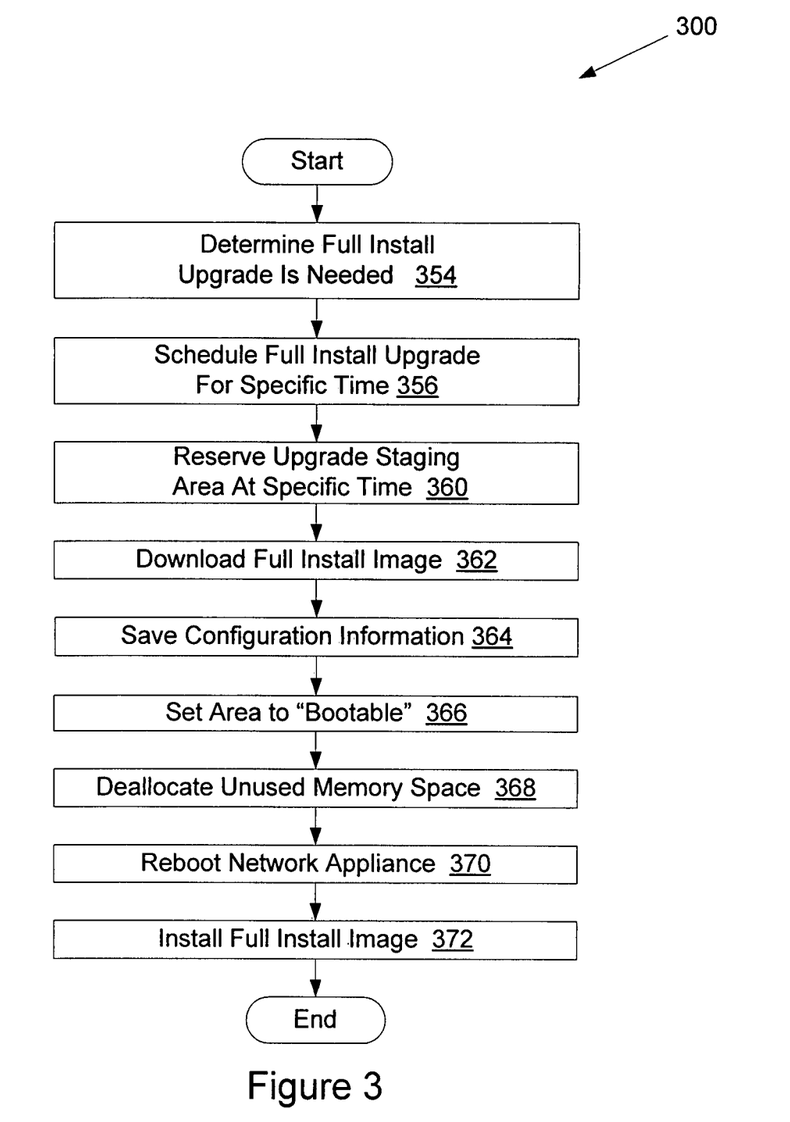
FIG. 3 is a flow diagram illustrating a method for upgrading a network appliance, in accordance with one embodiment of the present invention.

FIG. 3 is a flow diagram illustrating one embodiment of a client-based method 300 for upgrading a network appliance. The method may be performed by processing logic (that can be executed by the network appliance) that may comprise hardware (e.g., circuitry, dedicated logic, programmable logic, microcode, etc.), software (e.g., instructions run on a processing device to perform hardware simulation), or a combination thereof. In one embodiment, the method 300 is performed by a network appliance, such as network appliance 110 of FIG. 1.

Referring to FIG. 3, method 300 begins with processing logic determining that a full install upgrade of the network appliance is needed (block 354), and scheduling the full install upgrade for a specific time (block 356). Processing logic may decide to perform the full install upgrade if a recent upgrade performed via an upgrade patch has failed, or the latest full install image for the network appliance has become available at the upgrade server.

At block 360, processing logic reserves an upgrade staging area in a secondary memory storage of the network appliance to store information relating to the upgrade. The upgrade staging area can include a swap partition re-purposed for the upgrade process due to the lack of swapping operations during the upgrade.

At block 362, processing logic downloads the full install image from a server (e.g., an upgrade server) and saves and/or unpacks the information using the upgrade staging area. In an embodiment, the full install image is a collection of software packages in a pre-installed state that can be unpacked to create an executable image.

At block 364, processing logic saves critical configuration information to the upgrade staging area. The critical configuration information includes information that is used locally by the network appliance to properly operate (e.g., the client certificate and key, the local IP address of the network appliance, hardware configuration of the network appliance, etc.). Saving the critical configuration information may, for example, allow the old operating system memory space to be wiped clean from the hard drive, as described below.

At block 366, processing logic sets the upgrade staging area to "bootable." At block 368, processing logic (operating using code from the full install image) erases (or de-allocates) all or some of the old information stored on, for example, the operating system partition of the disk. The stored configuration information is retrieved and associated with the full install image, so that the configuration information can be accessed by processes of the full install image.

In one embodiment, the full install image (and associated configuration information) is copied over the old information. In another embodiment, the full install image is left in the upgrade staging area (which can then be designated, for example, as a bootable partition as described below). In yet another embodiment, the full install image can be copied to a third location, which can be made bootable.

At block 370, processing logic reboots the network appliance. Upon reboot, the processing logic can begin "cleanup" of memory space that is no longer needed by the upgrade. After the cleanup of unused memory space, processing logic begins with the installation of the full install image (block 372). In another embodiment, one or more software packages are installed into the areas previously cleared or deallocated in block 368.

Figure 4:
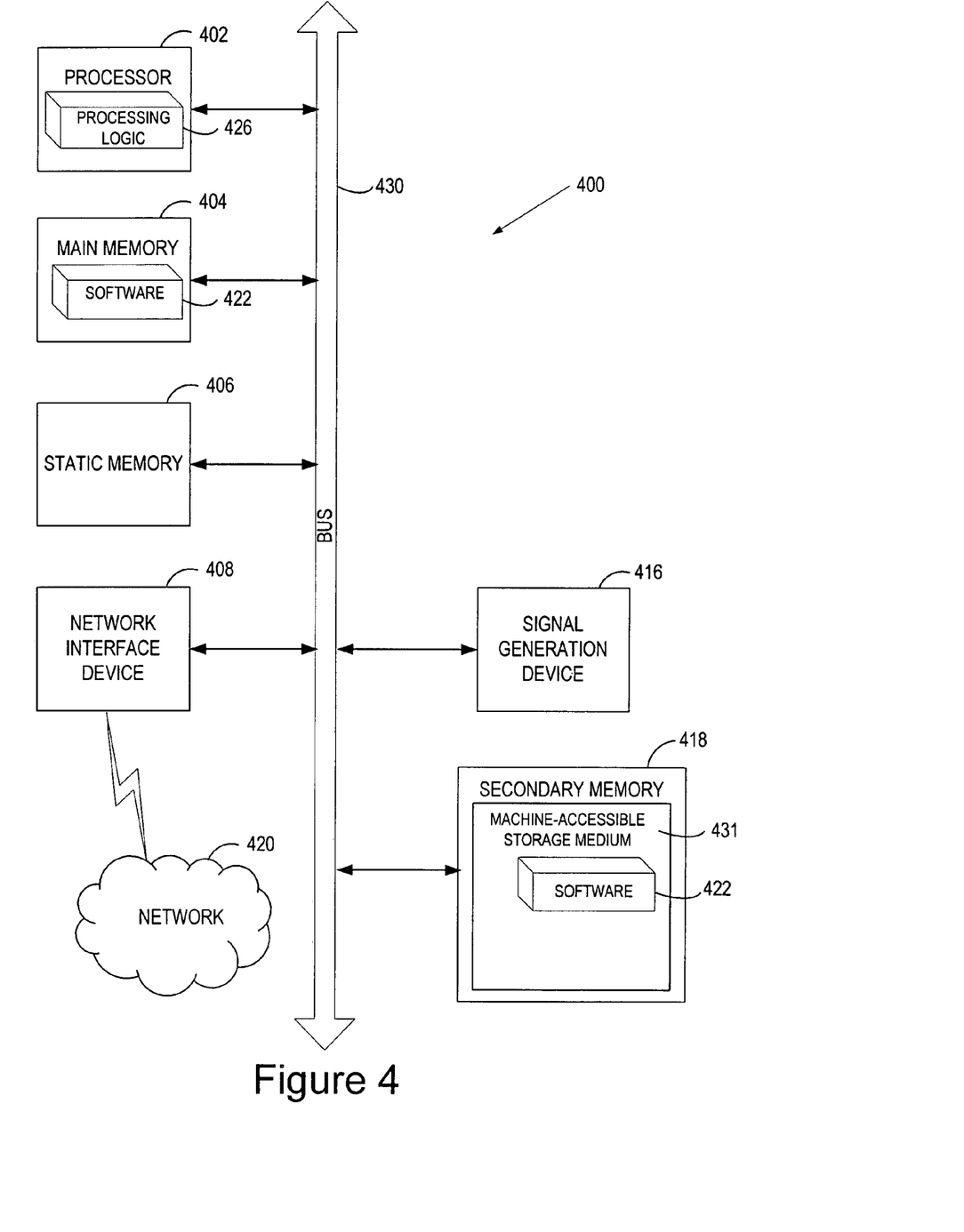
FIG. 4 illustrates a diagrammatic representation of a machine in the exemplary form of a computer system, in accordance with one embodiment of the present invention.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 400 includes a processor 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a secondary memory 418 (e.g., a data storage device), which communicate with each other via a bus 430.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 402 may also be one or more special-purpose processing devices such as an application specific integrated circuit (ASIC), a field programmable gate array (FPGA), a digital signal processor (DSP), network processor, or the like. Processor 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The secondary memory 418 may include a machine-readable storage medium (or more specifically a computer-readable storage medium) 431 on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-readable storage media. The software 422 may further be transmitted or received over a network 420 via the network interface device 408.

While the machine-readable storage medium 431 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
    detecting, by an upgrade manager of a network appliance, that an upgrade of a network appliance via an upgrade patch has failed, the upgrade manager comprising a component of the network appliance that controls upgrades of the network appliance;
    in response to the detecting, determining, by the upgrade manager, that the network appliance is to be modified using a full install image of the network appliance, the full install image comprising a collection of software packages in a pre-installed state that can be unpacked to create an executable image;
    scheduling, by the upgrade manager, an unattended install of the network appliance for a specific time determined by the upgrade manager; and
    performing, by the upgrade manager, the unattended install of the network appliance at the specific time, wherein the performing the unattended install comprises:
        reserving a staging area in a memory of the network appliance, the staging area comprising a swap partition of a hard drive of the network appliance;
        obtaining the full install image from an upgrade server;
        storing the obtained full install image in the staging area;
        obtaining configuration information of the network appliance that is used locally by the network appliance to operate;
        storing the configuration information in the staging are to be accessible to a process of the obtained full install image;
        identifying the staging area as bootable;
        rebooting the network appliance; and
        installing the obtained full install image onto the network appliance.

2. The method of claim 1, wherein determining that the network appliance is to be modified using the full install image further comprises determining that the full install image is available at the upgrade server.

3. The method of claim 2, further comprising:
    upon determining that the full install image is available at the upgrade server, performing the scheduling the unattended install for the specific time.

4. The method of claim 1, wherein the configuration information comprises at least one of a certificate, a key, a network address of the network appliance, or a hardware configuration of the network appliance.

5. The method of claim 1, further comprising deallocating unused memory space on the network appliance after the rebooting the network appliance.

6. The method of claim 1, wherein the reserving, the storing, the identifying, the rebooting, and the installing are performed without user interaction.

7. A non-transitory computer-readable storage medium including instructions that, when executed by a processing device, cause the processing device to perform operations comprising:
    detecting, by an upgrade manager executed by the processing device of a network appliance, that an upgrade of the network appliance via an upgrade patch has failed, the upgrade manager comprising a component of the network appliance that controls upgrades of the network appliance;
    in response to the detecting, determining, by the upgrade manager, that the network appliance is to be modified using a full install image of the network appliance, the full install image comprising a collection of software packages in a pre-installed state that can be unpacked to create an executable image;
    scheduling, by the upgrade manager, an unattended install of the network appliance for a specific time determined by the upgrade manager; and
    performing, by the upgrade manager, the unattended install of the network appliance at the specific time, wherein the performing the unattended install comprises:
        reserving a staging area in a memory of the network appliance, the staging area comprising a swap partition of a hard drive of the network appliance;
        obtaining the full install image from an upgrade server;
        storing the obtained full install image in the staging area;
        obtaining configuration information of the network appliance that is used locally by the network appliance to operate;
        storing the configuration information in the staging are to be accessible to a process of the obtained full install image;
        identifying the staging area as bootable;
        rebooting the network appliance; and
        installing the obtained full install image onto the network appliance.

8. The non-transitory computer-readable storage medium of claim 7, wherein determining that the network appliance is to be modified using the full install image further comprises determining that the full install image is available at the upgrade server.

9. The non-transitory computer-readable storage medium of claim 8, the operations further comprising:
    upon determining that the full install image is available at the upgrade server, performing the scheduling the unattended install for the specific time.

10. The non-transitory computer-readable storage medium of claim 7, wherein the configuration information comprises at least one of a certificate, a key, a network address of the network appliance, or a hardware configuration of the network appliance.

11. A network appliance apparatus, comprising:
    a memory device to store a staging area, the staging area comprising a swap partition of a hard drive of the network appliance;
    a processing device communicably coupled to the memory device; and
    an upgrade manager executable from the memory by the processing device, the upgrade manager to control upgrades of the network appliance apparatus and to:

detect that an upgrade of the network appliance apparatus via an upgrade patch has failed;

in response to the detecting, determine that the network appliance apparatus is to be modified using a full install image of the network appliance, the full install image comprising a collection of software packages in a pre-installed state that can be unpacked to create an executable image;

schedule an unattended install of the network appliance apparatus for a specific time determined by the upgrade manager; and perform an unattended install of the network appliance apparatus at the specific time by:

reserve the staging area in the memory device;

obtain the full install image from an upgrade server;

store the obtained full install image in the staging area;

obtain configuration information of the network appliance apparatus that is used locally by the network appliance apparatus to operate;

store the configuration information in the staging are to be accessible to a process of the obtained full install image;

identify the staging area as bootable;

reboot the network appliance apparatus; and install the obtained full install image onto the network appliance apparatus.

12. The network appliance apparatus of claim 11, wherein the processing device further to determine that the full install image is available at the upgrade server.

13. The network appliance apparatus of claim 11, wherein the configuration information comprises at least one of a certificate, a key, a network address of the network appliance apparatus, or a hardware configuration of the network appliance apparatus.

14. The method of claim 1, wherein the unattended install comprises an automated upgrade process of the network appliance performed without user interaction.

15. The non-transitory computer-readable storage medium of claim 7, wherein the operations further comprise deallocating unused memory space on the network appliance after the rebooting the network appliance.

16. The non-transitory computer-readable storage medium of claim 7, wherein the reserving, the storing, the identifying, the rebooting, and the installing are performed without user interaction.

17. The non-transitory computer-readable storage medium of claim 7, wherein the unattended install comprises an automated upgrade process of the network appliance performed without user interaction.

18. The network appliance apparatus of claim 12, wherein the processing device further to, upon determining that the full install image is available at the upgrade server, perform the scheduling the unattended install for the specific time.

19. The network appliance apparatus of claim 11, wherein the reserving, the storing, the identifying, the rebooting, and the installing are performed without user interaction, and wherein the unattended install comprises an automated upgrade process of the network appliance apparatus performed without user interaction.

20. The network appliance apparatus of claim 11, wherein the processing device further to deallocate unused memory space on the network appliance apparatus after the rebooting the network appliance apparatus.

* * * * *